United States Patent
Fujioka et al.

(10) Patent No.: US 11,869,174 B2
(45) Date of Patent: Jan. 9, 2024

(54) IMAGE PROCESSING APPARATUS, DISPLAY APPARATUS, IMAGE PROCESSING METHOD, AND NON-TRANSITORY COMPUTER READABLE MEDIUM

(71) Applicant: CANON KABUSHIKI KAISHA, Tokyo (JP)

(72) Inventors: Masaki Fujioka, Chiba (JP); Masaharu Yamagishi, Kanagawa (JP); Takehito Fukushima, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 105 days.

(21) Appl. No.: 17/690,401

(22) Filed: Mar. 9, 2022

(65) Prior Publication Data
US 2022/0301126 A1    Sep. 22, 2022

(30) Foreign Application Priority Data

Mar. 18, 2021 (JP) ................................. 2021-044832

(51) Int. Cl.
*G06T 5/00* (2006.01)

(52) U.S. Cl.
CPC .... *G06T 5/009* (2013.01); *G06T 2207/20092* (2013.01); *G06T 2207/20208* (2013.01)

(58) Field of Classification Search
CPC ........... G06T 5/009; G06T 2207/20092; G06T 2207/20208; G06T 5/40
See application file for complete search history.

(56) References Cited

U.S. PATENT DOCUMENTS

| | | |
|---|---|---|
| 9,936,180 B2 | 4/2018 | Fujioka |
| 9,990,704 B2 | 6/2018 | Nakatani et al. |
| 2019/0287450 A1* | 9/2019 | Urabe et al. ......... G09G 3/2088 |

FOREIGN PATENT DOCUMENTS

| | | | |
|---|---|---|---|
| JP | 2019041269 A | 3/2019 | |
| WO | WO-2018152063 A1 * | 8/2018 | ............... G06T 5/00 |

* cited by examiner

*Primary Examiner* — Jeffery A Brier
(74) *Attorney, Agent, or Firm* — Carter, DeLuca & Farrell LLP

(57) ABSTRACT

An image processing apparatus according to the present invention, includes at least one memory and at least one processor function as: a first determining unit configured to determine a first brightness range, which is included in a dynamic range of a first image and is higher than a predetermined brightness; and a first converting unit configured to convert the first image into a second image, of which a dynamic range is narrower than the dynamic range of the first image, based on the determination result by the first determining unit, wherein based on the first brightness range determined by the first determining unit, the first converting unit determines a second brightness range, which is included in the dynamic range of the second image and corresponds to the first brightness range.

20 Claims, 7 Drawing Sheets

IMAGE PROCESSING APPARATUS, DISPLAY APPARATUS, IMAGE PROCESSING METHOD, AND NON-TRANSITORY COMPUTER READABLE MEDIUM

BACKGROUND OF THE INVENTION

Field of the Invention

The present invention relates to an image processing apparatus, a display apparatus, an image processing method, and a non-transitory computer readable medium.

Description of the Related Art

Recently the handling of high dynamic range (HDR) images is becoming more widespread. An HDR image is an image having a relatively wide dynamic range (brightness range). As a type of HDR image system, a hybrid log-gamma (HLG) system is specified by the ITU REC.2100 standard.

The brightness range that is not higher than 1000 nits is called a narrow range, a brightness range that is higher than 1000 nits is called an over range, and a white in the over range is called an over white. In an HLG type HDR image, a narrow range is normally used, and a gradation value of 940 corresponds to 1000 nits. If a gradation value higher than 940 is used, a brightness up to about 1800 nits can be handled.

In video production, an HDR image and a standard dynamic range (SDR) image may be simultaneously produced (simultaneous production). An SDR image is an image having a dynamic range narrower than the dynamic range of an HDR image. In the simultaneous production, conversion from an HDR image into an SDR image (HDR-SDR conversion), for example, is performed.

In a conventional HDR-SDR conversion, the narrow range is converted into the full range (64 to 1023 gradation values in the case of 10 bits) of the SDR image. Therefore in a case where the dynamic range of the HDR image includes an over range, the gradation distribution (distribution of lightness) of the SDR image becomes considerably different from the HDR image. Specifically, the region of the over range in the HDR image becomes a white-clipping region in the SDR image.

Japanese Patent Application Publication No. 2019-41269 discloses an HDR-SDR conversion based on the brightness range of the HDR image. Metadata to indicate the maximum brightness of the contents, which is called the maximum content light level (MAX_CLL), may be added to a signal (data) of the HDR image. In this case, if the HDR image is converted into the SDR image using the conversion characteristics corresponding to the MAX_CLL, the dark region of the HDR image becomes a black clipping region in the SDR image. In order to control this black clipping, Japanese Patent Application Publication No. 2019-41269 provides a technique to perform the HDR-SDR conversion based on the MAX_CLL (maximum brightness of the contents) and a virtual brightness which is lower than the MAX_CLL.

However, in the case of the technique disclosed in Japanese Patent Application Publication No. 2019-41269, the over range and the narrow range are not distinguished, and a case where the dynamic range of the HDR image includes the over range is not considered. Therefore in the dynamic range of the SDR image, the brightness range corresponding to the over range may be too wide or too narrow in some cases. In such a case, the gradation distribution (distribution of lightness) of the SDR image becomes significantly different from that of the HDR image.

SUMMARY OF THE INVENTION

The present invention provides a technique that can convert the dynamic range of an image with controlling the change in the gradation distribution (distribution of lightness) of the image.

The present invention in its first aspect provides an image processing apparatus including at least one memory and at least one processor function as: a first determining unit configured to determine a first brightness range, which is included in a dynamic range of a first image and is higher than a predetermined brightness; and a first converting unit configured to convert the first image into a second image, of which a dynamic range is narrower than the dynamic range of the first image, based on the determination result by the first determining unit, wherein based on the first brightness range determined by the first determining unit, the first converting unit determines a second brightness range, which is included in the dynamic range of the second image and corresponds to the first brightness range.

The present invention in its second aspect provides an image processing apparatus including at least one memory and at least one processor which function as: a converting unit configured to convert a first image into a second image and a third image of which respective dynamic ranges are narrower than a dynamic range of the first image; and a control unit configured to control such that the second and the third image are displayed together.

The present invention in its third aspect provides a display apparatus including: the above mentioned image processing apparatus; and a display panel configured to display an image.

The present invention in its fourth aspect provides an image processing method including: a determining step of determining a first brightness range, which is included in a dynamic range of a first image and is higher than a predetermined brightness; and a converting step of converting the first image into a second image, of which a dynamic range is narrower than the dynamic range of the first image, based on the determination result in the determining step, wherein in the converting step, based on the first brightness range determined in the determining step, a second brightness range, which is included in the dynamic range of the second image and corresponds to the first brightness range, is determined.

The present invention in its fifth aspect provides an image processing method including: a converting step of converting a first image into a second image and a third image of which respective dynamic ranges are narrower than a dynamic range of the first image; and a control step of controlling such that the second and the third image are displayed together.

The present invention in its sixth aspect provides a non-transitory computer readable medium that stores a program, wherein the program causes a computer to execute an image processing method including: a determining step of determining a first brightness range, which is included in a dynamic range of a first image and is higher than a predetermined brightness; and a converting step of converting the first image into a second image, of which a dynamic range is narrower than the dynamic range of the first image, based on the determination result in the determining step, wherein in the converting step, based on the first brightness range determined in the determining step, a second brightness range, which is included in the dynamic range of the second image and corresponds to the first brightness range, is determined.

The present invention in its seventh aspect provides a non-transitory computer readable medium that stores a program, wherein the program causes a computer to execute an image processing method including: a converting step of converting a first image into a second image and a third image of which respective dynamic ranges are narrower than a dynamic range of the first image; and a control step of controlling such that the second and the third image are displayed together.

Further features of the present invention will become apparent from the following description of exemplary embodiments with reference to the attached drawings.

DESCRIPTION OF THE EMBODIMENTS

Embodiment 1

Embodiment 1 of the present invention will be described. In Embodiment 1, when a high dynamic range (HDR) image (first image) is converted into a standard dynamic range (SDR) image (second image), an over compatible range (second brightness range) of the SDR image widens as an over range (first brightness range) of the HDR image widens. The HDR image is an image having a relatively wide dynamic range (brightness range). The SDR image is an image having a dynamic range that is narrower than the dynamic range of the HDR image. The over range is included in the dynamic range of the HDR image, and is a brightness range higher than a predetermined brightness (e.g. 1000 nits), that is, a brightness range of over white. The over compatible range is included in the dynamic range of the SDR image, and is a brightness range corresponding to the over range. Here an example of the display apparatus performing the conversion from the HDR image into the SDR image (HDR-SDR conversion: first conversion) will be described, but the HDR-SDR conversion may be performed by an image processing apparatus (e.g. personal computer) that is separate from the display apparatus.

Figure 1:
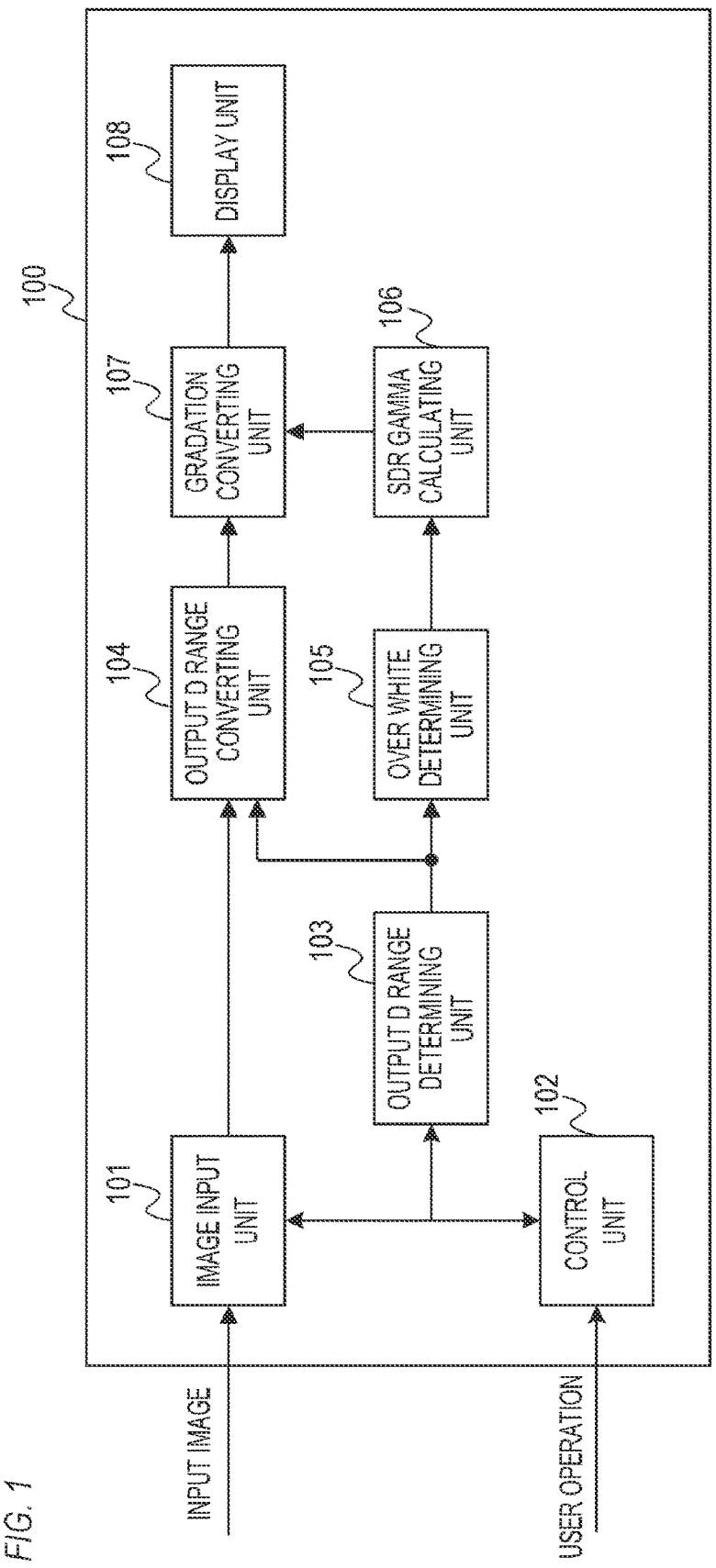
FIG. 1 is a block diagram depicting a configuration example of a display apparatus.

FIG. 1 is a block diagram depicting a configuration example of a display apparatus 100 according to Embodiment 1. The display apparatus 100 is, for example, a liquid crystal display apparatus, an organic electro-luminescence (EL) display apparatus, a projection apparatus (projector), or the like. The display apparatus 100 includes an image input unit 101, a control unit 102, an output dynamic range determining unit 103, an output dynamic range converting unit 104, an over white determining unit 105, an SDR gamma calculating unit 106, a gradation converting unit 107 and a display unit 108.

A signal (image signal) of an input image is inputted to the image input unit 101 via a serial digital interface (SDI) transmission. The signal (data) of the input image is a hybrid log-gamma (HLG) type signal (data), for example. The transmission of the signal is not limited to SDI transmission, but may be high-definition multimedia interface (HDMI) transmission. Further, the transmission of the signal may be an Internet protocol (IP) transmission via a local area network (LAN).

The image input unit 101 can acquire additional information (additional data; metadata) added to the signal of the input image. The additional information includes Infoframe information specified in HDMI, information on color gamut, information on whether the input image is HDR or SDR, and the like. The information on HDR may indicate a system of HDR (e.g. perceptual quantization (PQ) system, HLG system). In a case where the input image is an HDR image, the additional information may include a maximum content light level (MAX_CLL), a maximum frame average light level (MAX_FALL), or the like. The MAX_CLL is brightness information to indicate the maximum brightness of the contents, and the MAX_FALL is brightness information to indicate the maximum value of the average brightness of the frame. The MAX_CLL and the MAX-FALL may be provided for the entire contents, or may be provided for each scene of the contents. The image input unit 101 may acquire the statistics of the input image. The statistics of the input image are, for example, a histogram of the gradation values of the input image, a maximum gradation value of the input image, an average gradation value of the input image, or the like.

The control unit 102 is a central processing unit (CPU), for example, and executes programs stored in a memory (not illustrated), and controls each functional unit of the display apparatus 100.

The output dynamic range determining unit 103 determines the output dynamic range (dynamic range displayed on the display unit 108; dynamic range of HDR image). The output dynamic range determining unit 103 may determine the output dynamic range according to the user operation performed on the display apparatus 100. For example, the user may specify (set) an output dynamic range using a graphical user interface (GUI) indicated in FIG. 3. The output dynamic range determining unit 103 may determine the output dynamic range based on the additional data (metadata) added to the data of the input image. For example, the output dynamic range determining unit 103 may determine a brightness range not higher than the MAX_CLL (maximum brightness of the contents) as the output dynamic range. The output dynamic range determining unit 103 may determine the output dynamic range based on the gradation value (statistics) of the input image. For example, the output dynamic range determining unit 103 may acquire the maximum graduation value of the input image, determine the brightness corresponding to the maximum gradation value in accordance with the characteristic (correspondence of the gradation value and the brightness) in FIG. 2, and determine the brightness range, which is not higher than the determined brightness, as the output dynamic range.

Based on the output dynamic range determined by the output dynamic range determining unit 103, the output dynamic range converting unit 104 converts the input image into the HDR image having the output dynamic range (second conversion). For example, the output dynamic range converting unit 104 limits (clips) the gradation value corresponding to the brightness higher than the maximum brightness of the output dynamic range to the gradation value corresponding to this maximum brightness. Then the gradation distribution (distribution of lightness) of the region corresponding to the output dynamic range can be maintained in the input image. The output dynamic range converting unit 104 may compress the dynamic range of the input image in general by gain processing, knee correction, or the like. Then generation of white clipping or black clipping, due to the conversion, can be controlled.

Figure 2:
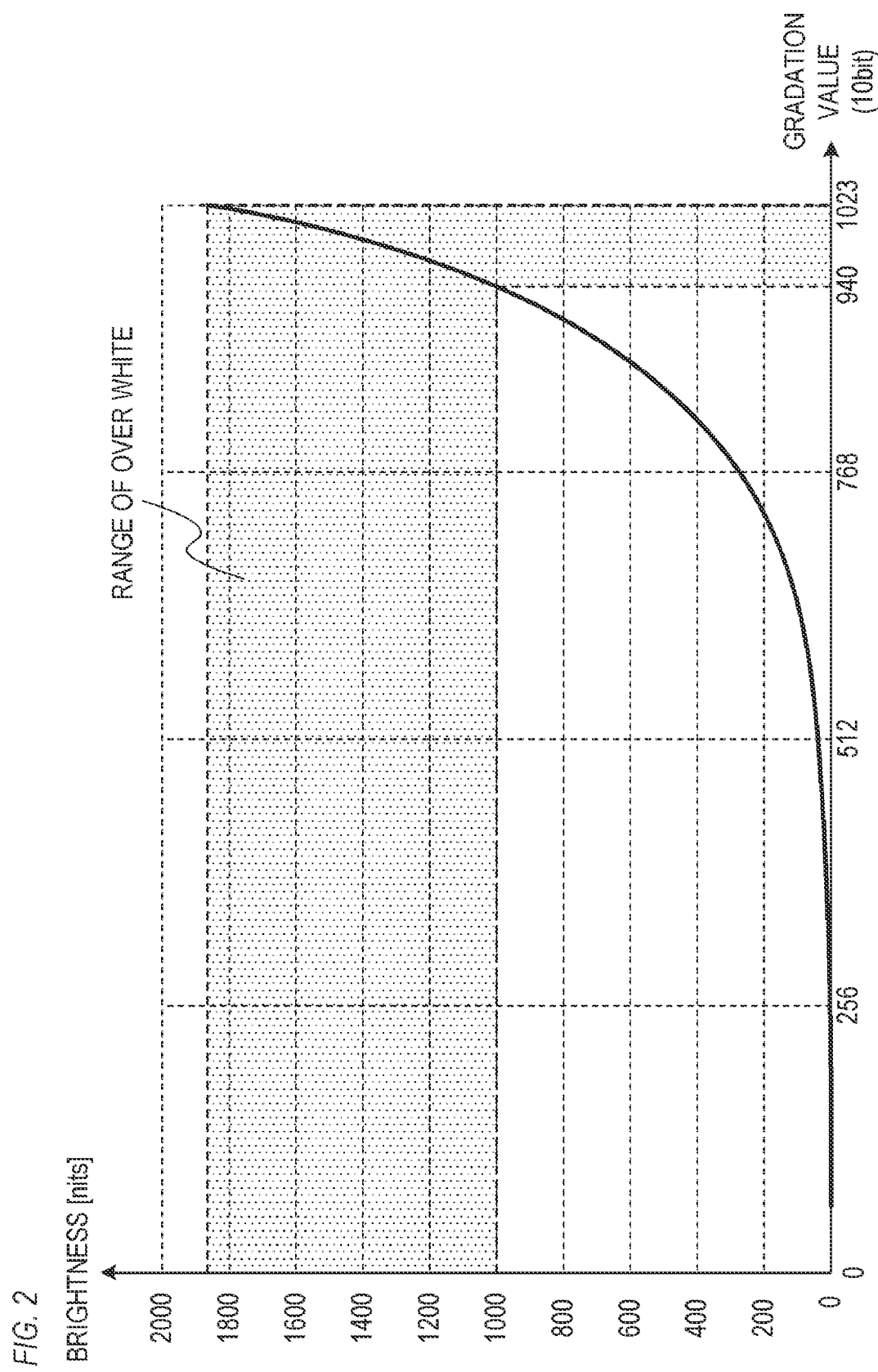
FIG. 2 is a graph indicating an example of a characteristic of an HLG system.
Figure 3:
FIG. 3 is an example of a GUI for setting an output dynamic range.

The over white determining unit 105 determines the over range (brightness range or over white) included in the output dynamic range determined by the output dynamic range determining unit 103. FIG. 2 indicates the characteristic (correspondence between the gradation value and the brightness) of the HLG system. In Embodiment 1, it is assumed that the gradation value is a 10-bit value in a 0 to 1023 range. The gradation values 64 to 940 correspond to the narrow range, and the gradation values not lower than 941 correspond to the over range. The gradation value 940 corresponds to the brightness 1000 nits. By using a gradation value higher than 940, brightness up to about 1800 nits can be handled. A number of bits of the gradation value is not especially limited, and the number of bits may be different between the HDR image and the SDR image, such as 10 bits in the HDR image and 8 bits (0 to 255) in the SDR image.

Here it is assumed that the maximum brightness in the output dynamic range determined by the output dynamic range determining unit 103 (1001 to 1800 nits) is the HLGOWRange, and the maximum brightness in the narrow range (1000 nits) is the MaxNRange. The over white determining unit 105 determines a brightness range that is higher than MaxNRange and not higher than HLGOWRange as the over range.

The SDR gamma calculating unit 106 determines the over compatible range based on the determination result by the over white determining unit 105 (determined over range), and generates a conversion table T. The over compatible range is a brightness range that is included in the dynamic range of the SDR image, and corresponds to the over range. The conversion table T is a conversion table used to convert the gradation value of the HDR image, acquired by the output dynamic range converting unit 104 through conversion, into the gradation value of the SDR image. The conversion table T is generated considering the characteristics of the display unit 108. For example, if the display apparatus 100 is a liquid crystal display apparatus, the conversion table T is generated considering the emission brightness of the backlight and the characteristics of the liquid crystal panel. The conversion table T is generated such that not only the dynamic range, but also the color gamut can be decreased. For example, the conversion table T is generated such that the color gamut specified in BT.2020 can be converted into the color game specified in BT.709. The specific method of generating the conversion table T will be described later.

The gradation converting unit 107 converts the gradation values of the HDR image, acquired by the conversion of the output dynamic range converting unit 104 into the gradation values of the SDR image, using the conversion table T generated by the SDR gamma calculating unit 106 (gradation conversion: HDR-SDR conversion, first conversion). Here an example of using the conversion table T was described, but the gradation converting unit 107 may convert the HDR image into the SDR image using a conversion formula, for example.

The display unit 108 is a display panel to display the SDR image acquired by the gradation converting unit 107.

An example of the operation of the display apparatus 100 will be described. Here the input image is assumed to be an HLG type HDR image. When the input image is inputted to the image input unit 101, the image input unit 101 sends the acquired metadata and statistics to the output dynamic range determining unit 103, and sends the input image to the output dynamic range converting unit 104. The output dynamic range determining unit 103 determines the output dynamic range based on the user operation, or the metadata, statistics, or the like, from the image input unit 101, and notifies the output dynamic range to the output dynamic range converting unit 104 and the over white determining unit 105. When the input image is received from the image input unit 101, the output dynamic range converting unit 104 converts the input image into an HDR image having the output dynamic range notified from the output dynamic range determining unit 103. Then the output dynamic range converting unit 104 sends the HDR image acquired by the conversion to the gradation converting unit 107. When the output dynamic range is notified from the output dynamic range determining unit 103, the over white determining unit 105 determines the over range included in the output dynamic range, and sends the determination result (determined over range) to the SDR gamma calculating unit 106. When the determination result is received from the over white determining unit 105, the SDR gamma calculating unit 106 generates a conversion table T based on this determination result, and sends the conversion table T to the gradation converting unit 107. The gradation converting unit 107 converts the HDR image received from the output dynamic range converting unit 104 into an SDR image based on the conversion table T received from the SDR gamma calculating unit 106. Then the gradation converting unit 107 sends the SDR image to the display unit 108. When the SDR image is received from the gradation converting unit 107, the display unit 108 displays this SDR image.

Figure 4:
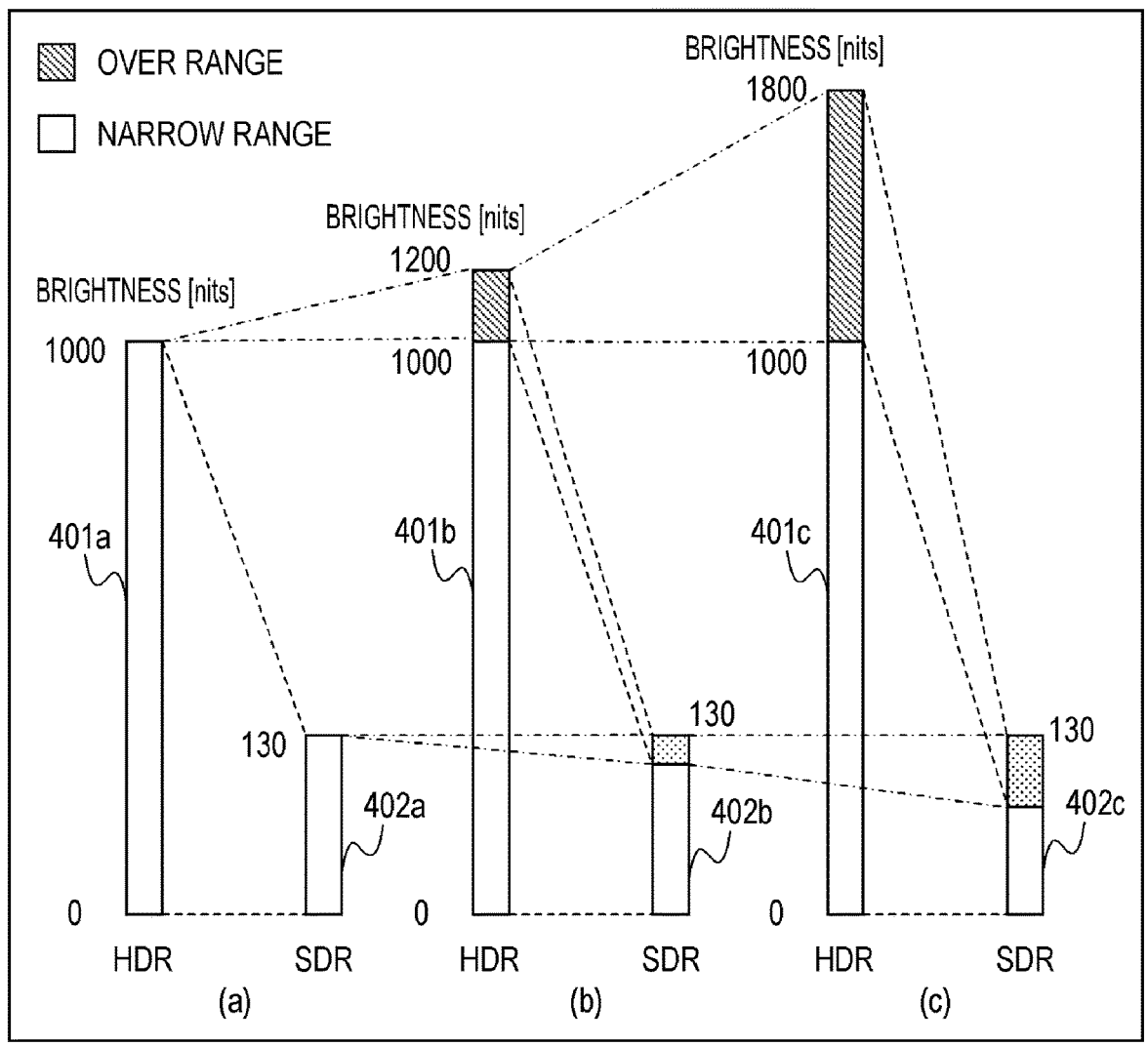
FIG. 4 is a diagram indicating examples of a dynamic range.

An example of a method of generating the conversion table T will be described. FIG. 4 indicates examples of an output dynamic range and a dynamic range of the SDR image. Out of the output dynamic range, the white portion indicates a narrow range, and the hatched portion indicates an over range. Out of the dynamic range of the SDR image, the white portion indicates a brightness range corresponding to the narrow range (narrow compatible range), and the hatched portion indicates a brightness range corresponding to the over range (over compatible range).

In (a) of FIG. 4, the maximum brightness of the output dynamic range 401a is 1000 nits, and the over range is not included in the output dynamic range 401a. In this case, the SDR gamma calculating unit 106 generates a conversion table T to convert (narrow) the output dynamic range 401a into the dynamic range 402a. Since the over range is not included in the output dynamic range 401a, the dynamic range 402a does not include the over compatible range (the entire dynamic range 402a is a narrow compatible range). Thereby it can be prevented to excessively compress the narrow range, and as a result, the gradation distribution (distribution of lightness) of the SDR image can be close to that of the HDR image.

In (b) of FIG. 4, the maximum brightness of the output dynamic range 401b is 1200 nits, and the over range of 1001 to 1200 nits is included in the output dynamic range 401b. In this case, the SDR gamma calculating unit 106 generates a conversion table T used to convert the output dynamic range 401b into the dynamic range 402b. Since the over range is included in the output dynamic range 401b, the dynamic range 402b includes the over compatible range. Thereby it can be prevented that the over range region, out of the HDR image, becomes a white clipping region in the SDR image, and the gradation distribution of the SDR image can be close to that of the HDR image.

In (c) of FIG. 4, the maximum brightness of the output dynamic range 401c is 1800 nits, and the over range of 1001 to 1800 nits is included in the output dynamic range 401c. In this case, the SDR gamma calculating unit 106 generates a conversion table T used to convert the output dynamic range 401c into the dynamic range 402c. Since the over range is included in the output dynamic range 401c, the dynamic range 402c includes the over compatible range. Further, the over range of the output dynamic range 401c is wider than the over range of the output dynamic range 401b, hence the over compatible range of the dynamic range 402c is increased to be wider than the over compatible range of the dynamic range 402b. Thereby it can be prevented that the over range region, out of the HDR image, becomes a white clipping region in the SDR image, and that the over compatible range becomes too narrow, and the gradation distribution of the SDR image can be close to that of the HDR image.

As described above, according to Embodiment 1, the over compatible range (brightness range corresponding to the over range) of the SDR image is determined based on the over range of the HDR image. Thereby the dynamic range of the image can be converted with controlling the change in the gradation distribution (distribution of lightness) of the image. Specifically, as the over range widens, the over compatible range widens, whereby the gradation distribution of the SDR image can become close to that of the HDR image, with controlling the over compatible range from becoming too narrow/too wide. In other words, the SDR image having a high reproduction degree (reproducibility) of the gradation distribution of the HDR image can be acquired.

Embodiment 2

Embodiment 2 of the present invention will be described. In the following, aspects (e.g. configuration, processing) different from Embodiment 1 will be described in detail, and description on aspect the same as Embodiment 1 will be omitted unless necessary. In Embodiment 2, the over compatible range is determined based on the ratio of the maximum brightness of the narrow range and the maximum brightness of the over range.

Here the following definitions are used.
HLGOWRange: maximum brightness of the output dynamic range determined by the output dynamic range determining unit 103 (1001 to 1800 nits)
MaxNRange: maximum brightness of the narrow range (1000 nits)
MaxSDRRange: maximum brightness of the dynamic range of the SDR image (130 nits)
SDROWThreshold: brightness at the boundary between the narrow compatible range and the over compatible range in the dynamic range of the SDR image The over compatible range is a brightness range that is higher than the SDROWThreshold and is not higher than MaxSDRRange, and the SDR gamma calculating unit 106 generates the conversion table T such that MaxNRange is converted into SDROWThreshold. SDROWThreshold can be calculated using the following Expression 1.

SDROWThreshold=MaxSDRRange×MaxNRange/HLGOWRange  (Expression 1)

Figure 5:
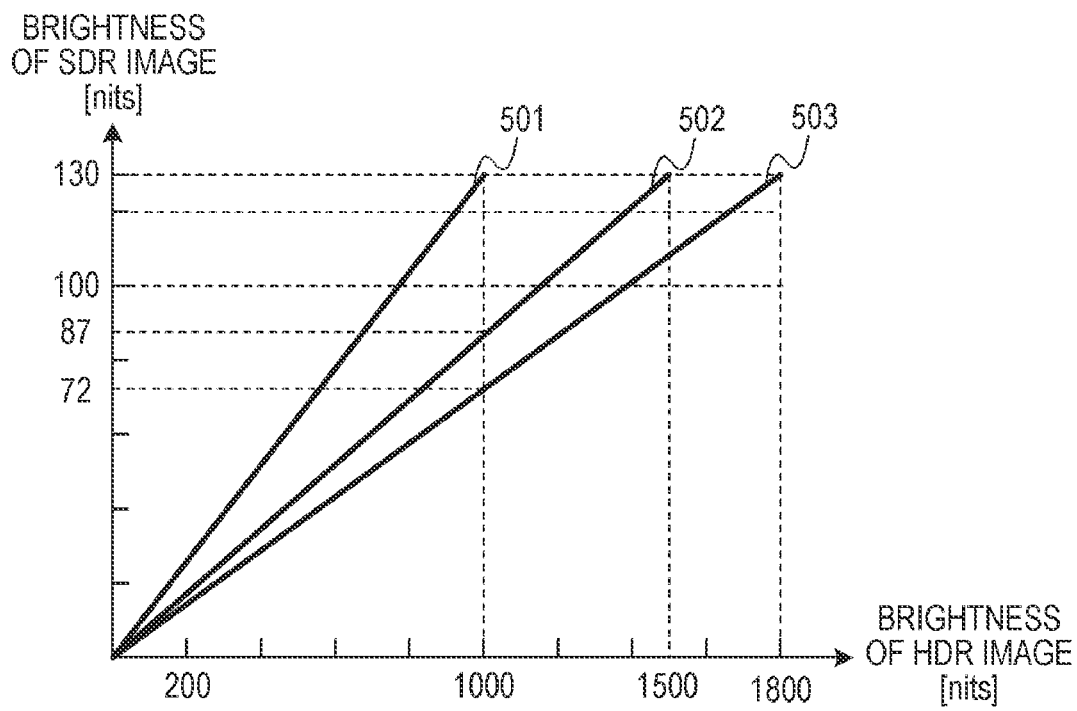
FIG. 5 is a diagram indicating an example of the conversion characteristics of a conversion table.

An example of the method of generating the conversion table T will be described. FIG. 5 indicates an example of the conversion characteristics of the conversion table T (correspondence between the brightness of the HDR image and the brightness of the SDR image).

In the case where the maximum brightness of the output dynamic range HLGOWRange is 1000 nits, the SDR gamma calculating unit 106 generates the conversion table T so that the HDR-SDR conversion is performed for the conversion characteristic 501. According to Expression 1, SDROWThreshold=MaxSDRRange×MaxNRange/HLGOWRange=130×1000/1000=130 nits is calculated. Therefore in the HDR-SDR conversion for the conversion characteristic 501, 1000 nits of the HDR image is converted into 130 nits of the SDR image.

In the case where the maximum brightness of the output dynamic range HLGOWRange is 1500 nits, the SDR gamma calculating unit 106 generates the conversion table T so that the HDR-SDR conversion is performed for the conversion characteristic 502. According to Expression 1, SDROWThreshold=MaxSDRRange MaxNRange/HLGOWRange=130×1000/1500=87 nits is calculated. Therefore in the HDR-SDR conversion for the conversion characteristic 502, 1000 nits of the HDR image is converted into 87 nits of the SDR image.

In the case where the maximum brightness of the output dynamic range HLGOWRange is 1800 nits, the SDR gamma calculating unit 106 generates the conversion table T so that the HDR-SDR conversion is performed for the conversion characteristic 503. According to Expression 1, SDROWThreshold=MaxSDRRange×MaxNRange/HLGOWRange=130×1000/1800=72 nits is calculated. Therefore in the HDR-SDR conversion for the conversion characteristic 503, 1000 nits of the HDR image is converted into 72 nits of the SDR image.

As described above, according to Embodiment 2, the over compatible range is determined based on the ratio of the maximum brightness of the narrow range and the maximum brightness of the over range. Thereby the dynamic range of the image can be converted with controlling the change in the gradation distribution (distribution of lightness) of the image.

The over compatible range may also be determined based on the ratio of the gradation value of the HDR image corresponding to the maximum brightness of the narrow range and the gradation value of the HDR image corresponding to the maximum brightness of the over range.

Here the following definitions are used (gradation value is assumed to be a value of 10 bits).
HLGOWVal: gradation value of the HDR image corresponding to the maximum brightness of the output dynamic range determined by the output dynamic range determining unit 103
MaxNVal: gradation value of the HDR image corresponding to the maximum brightness of the narrow range (940)

MaxSDRVal: gradation value of the SDR image corresponding to the maximum brightness of the dynamic range of the SDR image (1023)

SDROWThresholdVal: gradation value of the SDR image corresponding to the brightness at the boundary between the narrow compatible range and the over compatible range in the dynamic range of the SDR image HLGOWVal can be determined from a characteristic in FIG. 2, for example. In a case where the maximum brightness of the output dynamic range is 1500 nits, HLGOWVal=1000 can be determined from a characteristic in FIG. 2. The gradation range of the over compatible range is higher than SDROWThresholdVal, and is not higher than MaxSDRVal. The SDR gamma calculating unit 106 may generate the conversion table T such that MaxNVal is converted into SDROWThresholdVal. SDROWThresholdVal can be calculated using the following Expression 2.

SDROWThresholdVal=MaxSDRVal×MaxNVal/HLGOWVal (Expression 2)

Instead of calculation using the linear ratio (ratio of brightness or gradation value), the over compatible range may be determined by calculation using a weight or coefficient. The over compatible range may be determined according to a user operation. In this case, the user may specify an over compatible range based on the over range such that the over compatible range widens as the over range widens.

Embodiment 3

Embodiment 3 of the present invention will be described. In the following, aspects (e.g. configuration, processing) different from Embodiments 1 and 2 will be described in detail, and description on aspects the same as Embodiments 1 and 2 will be omitted unless necessary. In Embodiment 3, the over compatible range is determined based on the ratio of the width of the over range out of the output dynamic range, and the width of the brightness range determined excluding a predetermined brightness range from the narrow range (remaining brightness range).

In the HDR-SDR conversion, a part of the output dynamic range may be handled as a linear range considering the gradation of an image in the low brightness region. The linear range is a brightness range in which the brightness of the SDR image linearly changes with respect to the change of the brightness of the HDR image. If the brightness range in the low brightness region is compressed without setting the linear range, the gradation of the image in the low brightness range may deteriorate significantly. Therefore in Embodiment 3, the linear range on the low brightness side is used as the predetermined brightness range mentioned above, and the over compatible range is determined with excluding the linear range, whereby the conversion table T is generated.

Figure 6:
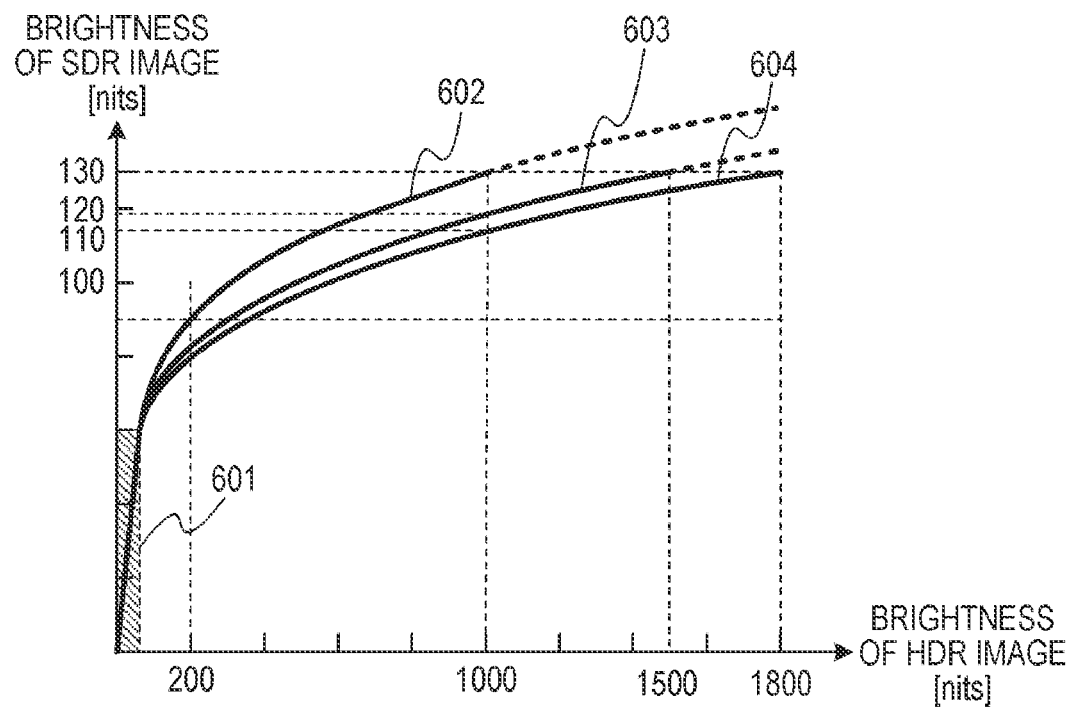
FIG. 6 is a diagram indicating an example of the conversion characteristics of a conversion table.

An example of the method of generating the conversion table T will be described. FIG. 6 indicates an example of a conversion characteristic of the conversion table T (correspondence between the brightness of the HDR image and the brightness of the SDR image). The hatched region 601 indicates a region of the linear range.

In the case where the maximum brightness of the output dynamic range is 1000 nits, the SDR gamma calculating unit 106 generates the conversion table T, so that the HDR-SDR conversion is performed for the conversion characteristic 602. The over compatible range is not set since the over range does not exist.

In the case where the maximum brightness of the output dynamic range is 1500 nits, the SDR gamma calculating unit 106 generates the conversion table T so that the HDR-SDR conversion is performed for the conversion characteristic 603. The over range is the brightness range of 1001 to 1500 nits, and the brightness range of about 120 nits to 130 nits is set as the over compatible range. In the conversion characteristic 603, the brightness after the conversion (brightness of the SDR image) becomes lower than that of the conversion characteristic 602 in the brightness range of the narrow range, excluding the linear range of the region 601.

In the case where the maximum brightness of the output dynamic range is 1800 nits, the SDR gamma calculating unit 106 generates the conversion table T so that the HDR-SDR conversion is performed for the conversion characteristic 604. The over range is the brightness range of 1001 to 1800 nits, and the brightness range of about 110 nits to 130 nits is set as the over compatible range. In the conversion characteristic 604, the brightness after the conversion (brightness of the SDR image) becomes lower than that of the conversion characteristics 602 and 603 in the brightness range of the narrow range, excluding the linear range of the region 601.

The conversion characteristics 603 and 604 are characteristics determined by multiplying the conversion characteristic 602 (brightness of the SDR image indicated by the conversion characteristic 602 including the broken line portion in FIG. 6) by a gain, so that the maximum brightness of the output dynamic range is converted into the maximum brightness of the dynamic range of the SDR image.

In FIG. 6, the conversion characteristic in the linear range (correspondence between the brightness of the HDR image and the brightness of the SDR image) does not change even if the over range changes. Therefore the gradation of the image in the low brightness region does not deteriorate significantly due to the HDR-SDR conversion.

As described above, according to Embodiment 3, the over compatible range is determined based on the ratio of the width of the over range out of the output dynamic range and the width of the brightness range, determined by excluding a predetermined brightness range from the narrow range (remaining brightness range). Thereby the dynamic range of the image can be converted with controlling the change of the gradation distribution (distribution of lightness) of the image. Further, according to Embodiment 3, the conversion characteristic (correspondence between the brightness of the HDR image and the brightness of the SDR image) in a predetermined brightness range (linear range on the low brightness side) does not change, even if the over range changes. Therefore the gradation of the image in the low brightness region does not deteriorate significantly due to the HDR-SDR conversion.

The predetermined brightness range is not limited to the linear range. For example, a brightness range not higher than the reference brightness, such as a brightness of the reference white of the HDR image may be used as the predetermined brightness range. Further, instead of calculation using a gain, the conversion characteristic (conversion table T) may be generated by calculation using a weight or coefficient.

Embodiment 4

Embodiment 4 of the present invention will be described. In the following, aspects (e.g. configuration, processing)

different from Embodiments 1 to 3 will be described in detail, and description on aspects the same as Embodiment 1 to 3 will be omitted unless necessary. In Embodiment 4, the dynamic range of the SDR image can be changed, and the dynamic range of the SDR image widens as the over range widens.

Figure 7:
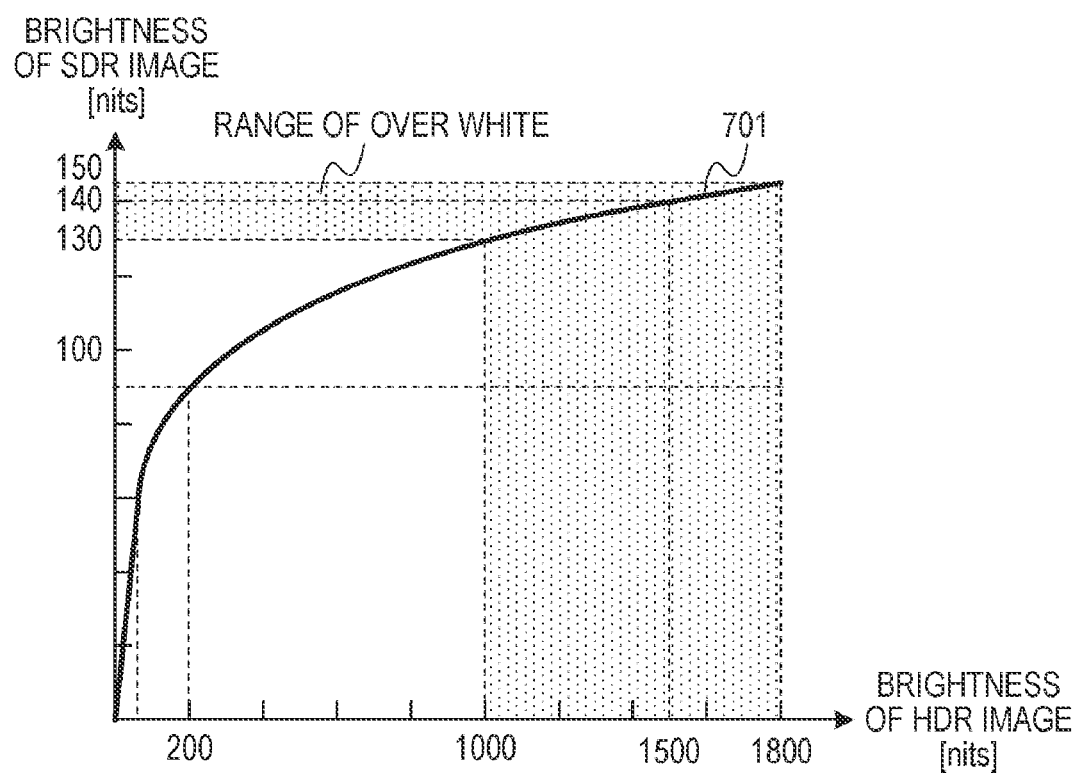
FIG. 7 is a diagram indicating an example of the conversion characteristics of a conversion table.

FIG. 7 indicates an example of a conversion characteristic of the conversion table T (correspondence between the brightness of the HDR image and the brightness of the SDR image). The conversion characteristic 701 is a characteristic used to convert the brightness 1000 nits of the HDR image (maximum brightness of the narrow range) into the brightness 130 nits of the SDR image. If an output dynamic range, of which maximum brightness is higher than 1001 nits (output dynamic including the over range), is set, an over compatible range that is higher than 130 nits is set. Then the brightness of the over range (higher than 1001 nits) is converted into a brightness higher than 130 nits. For example, in the case where the output dynamic range, of which maximum brightness is 1500 nits, is set, an over compatible range of 131 to about 140 nits is set for the over range of the 1001 to 1500 nits. In the case where the output dynamic range, of which maximum brightness is 1800 nits, is set, an over compatible range of 131 to about 150 nits is set for the over range of 1001 to 1800 nits.

The display unit 108 operates based on the setting of the output dynamic range, so that the brightness of the SDR image can be displayed (sets the display brightness). Considering the setting of the display brightness in the display unit 108, the SDR gamma calculating unit 106 generates the conversion table T so that the HDR-SDR conversion is performed with the conversion characteristic 701 in FIG. 7.

As described above, according to Embodiment 4, the dynamic range of the SDR image widens as the over range widens. Therefore the dynamic range of the image can be converted with controlling the change of the gradation distribution of the image (distribution of the lightness) even more. Further, in the case of the method described with reference to FIG. 7, the conversion characteristic of the narrow range is constant (fixed) regardless the setting of the output dynamic range (e.g. whether or not over range exists, width of the over range, etc.). Therefore for the region of the narrow range, the brightness of the SDR can be maintained to be constant, and the reproduction degree (reproducibility) of the gradation distribution of the HDR image can be maintained to be constant regardless the setting of the output dynamic range.

An example of increasing the conversion characteristic was described above, but the conversion characteristic (conversion table T) may be generated by calculation using a weight or coefficient.

Embodiment 5

Embodiment 5 of the present invention will be described. In the following, aspects (e.g. configuration, processing) different from Embodiments 1 to 4 will be described in detail, and description on aspects the same as Embodiments 1 to 4 will be omitted unless necessary. In Embodiment 5, a plurality of SDR images are displayed for comparison. Thereby the user can easily recognize the difference in the SDR images, depending on whether or not the over compatible range exists and the difference thereof.

Figure 8:
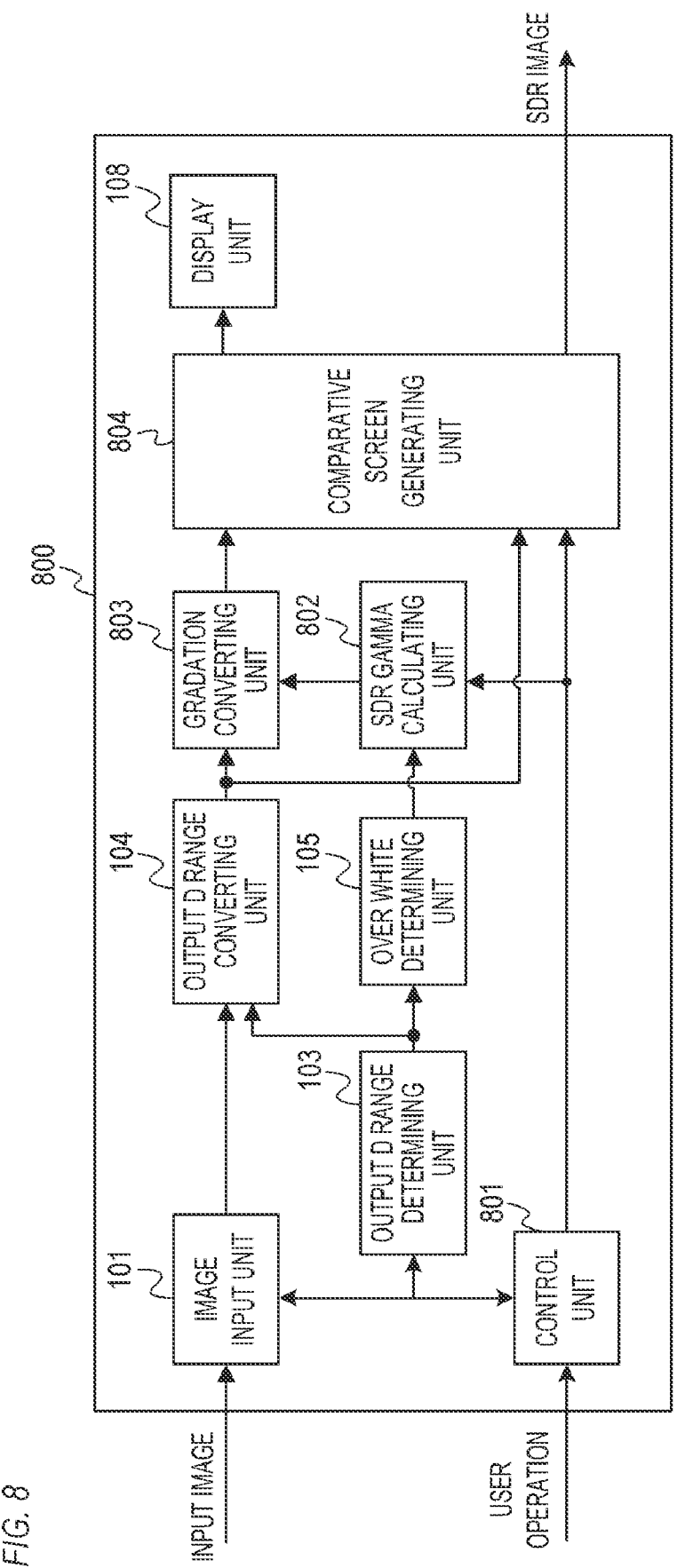
FIG. 8 is a block diagram depicting a configuration example of a display apparatus.

FIG. 8 is a block diagram depicting a configuration example of a display apparatus 800 according to Embodiment 5. In FIG. 8, a functional unit the same as Embodiments 1 to 4 (FIG. 1) is denoted with a same reference sign as that of Embodiments 1 to 4. Just like the display apparatus 100 of Embodiments 1 to 4, the display apparatus 800 includes the image input unit 101, the output dynamic range determining unit 103, the output dynamic range converting unit 104, the over white determining unit 105, and the display unit 108. Furthermore, the display apparatus 800 includes a control unit 801, an SDR gamma calculating unit 802, a gradation converting unit 803, and a comparative screen generating unit 804.

The control unit 801 performs the processing steps the same as those by the control unit 102 of Embodiments 1 to 4. Furthermore, the control unit 801 instructs the SDR gamma calculating unit 802 and the comparative screen generating unit 804 on the screen division. The instruction on the screen division is, for example, an instruction on a two-screen display, a four-screen display, or the like.

The SDR gamma calculating unit 802 performs processing steps similar to those of the SDR gamma calculating unit 106 of Embodiments 1 to 4. Furthermore, when the instruction on the screen division is received from the control unit 801, the SDR gamma calculating unit 802 generates a plurality of different conversion tables T, and outputs the plurality of conversion tables T to the gradation converting unit 803. The plurality of conversion tables T include the following conversion tables, for example.

- a conversion table that is acquired using the over range determined by the over white determining unit 105, that is, a conversion table that is acquired by the same method as Embodiments 1 to 4
- a conversion table that is acquired based on an assumption that an over range does not exist, that is, a conversion table which does not include the over compatible range
- a conversion table that is acquired using a brightness range wider than the over range determined by the over white determining unit 105, that is, a conversion table of which over compatible range is wider than the conversion table acquired by the same method as Embodiments 1 to 4
- a conversion table that is acquired using a brightness range narrower than the over range determined by the over white determining unit 105, that is, a conversion table of which over compatible range is narrower than the conversion table acquired by the same method as Embodiments 1 to 4

The gradation converting unit 803 performs the same processing steps as the gradation converting unit 107 of Embodiments 1 to 4. Furthermore, in a case where a plurality of conversion tables T are outputted from the SDR gamma calculating unit 802, the gradation converting unit 803 generates a plurality of SDR images which correspond to the plurality of conversion tables T respectively, and outputs the plurality of SDR images to the comparative screen generating unit 804. The plurality of SDR images include an SDR image acquired using the conversion table T which is the same as that of Embodiments 1 to 4 (second image), and an SDR image acquired using a conversion table T which is different from that of Embodiments 1 to 4 (third image).

According to the instruction on the screen division outputted from the control unit 801, the comparative screen generating unit 804 generates a comparative screen where a plurality of SDR images are disposed, so that the plurality of SDR images outputted from the gradation converting unit 803 are displayed together on the display unit 108, and outputs this comparative screen to the display unit 108.

FIGS. 9A to 9F are examples of the comparative screen.

Figure 9A:
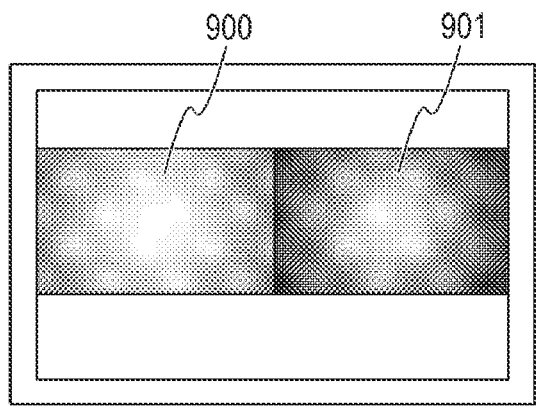
FIGS. 9A to 9F are diagrams indicating examples of a comparative screen.

FIG. 9A indicates a conventional comparative screen. As illustrated in FIG. 9A, in a conventional comparative screen, an HDR image 900 which the output dynamic range converting unit 104 acquired by conversion, and an SDR image 901 for which the over compatible range is not set, are displayed together. In the case of the display in FIG. 9A, the user can recognize (confirm) the change of image quality caused by the HDR-SDR conversion, but cannot recognize the difference of the SDR images depending on whether or not the over compatible range exists.

Therefore in Embodiment 5, a plurality of SDR images having different over compatible ranges are displayed together, so as to recognize the difference of the SDR images depending on whether or not the over compatible range exists, and the different thereof. FIGS. 9B to 9F are comparative screens according to Embodiment 5.

Figure 9B:
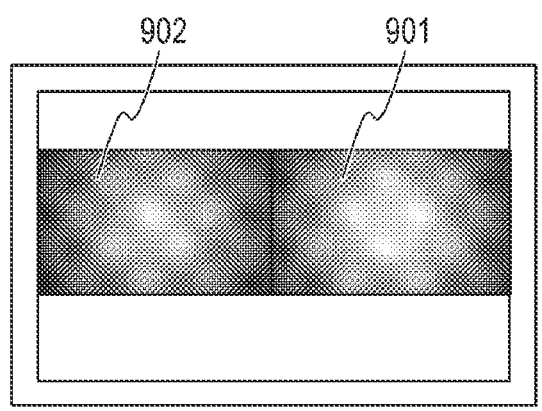

FIG. 9B indicates a comparative screen on which two SDR images, 901 and 902, are displayed together (two-screen display comparative screen). The SDR image 901 is an SDR image for which the over compatible range is not set, and the SDR image 902 is an SDR image for which the over compatible range is set. One of the SDR images, 901 or 902, is an SDR image acquired using the same conversion table T as that of Embodiments 1 to 4 (second image), and the other of the SDR images, 901 or 902, is an SDR image acquired using a conversion table T that is different from that of Embodiments 1 to 4 (third image). In the case of the display in FIG. 9B, the user can recognize the difference of the SDR images depending on whether or not the over compatible range exists. Instead of the SDR image 901, an SDR image, for which an over compatible range that is different from that of the SDR image 902 is set, may be displayed. Then the user can recognize the difference of the SDR images depending on the difference of the over compatible range.

Figure 9C:
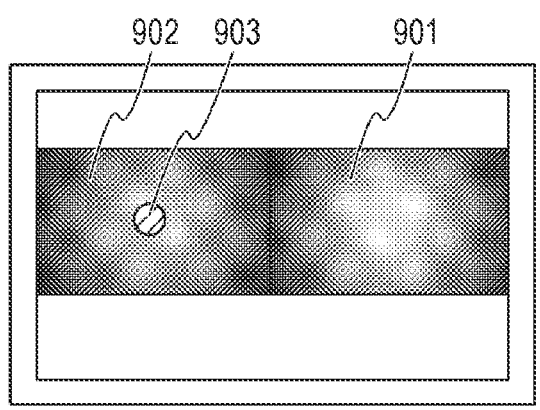

As indicated in FIG. 9C, the region 903 of the over compatible range may be made identifiable in the SDR image 902. Then the user can easily recognize the difference of the SDR images depending on whether or not the over compatible range exists, and the difference thereof. The method of making the region 903 identifiable is not especially limited, and, for example, the region 903 may be made identifiable by coloring the region 903 of the over compatible range. The method of coloring, the color used, and the like are not especially limited. For example, the region 903 may be colored by replacing the pixel values in the region 903 with fixed values. In a case where the gradation value of the SDR image 902 is an 8-bit value (0 to 255), the region 903 can be colored red by replacing the RGB values (R value, G value, B value) of the region 903 with (255, 0, 0). The contour of the region 903 may be framed to stand out by setting the pixel values of the contour of the region 903 to fixed values, for example. The region 903 may be displayed in a predetermined pattern (e.g. zebra pattern). A histogram of the gradation values or brightness of the SDR image 902 may be additionally be displayed, and the portion of the histogram corresponding to the region 903 may be made identifiable by coloring or the like.

Figure 9D:
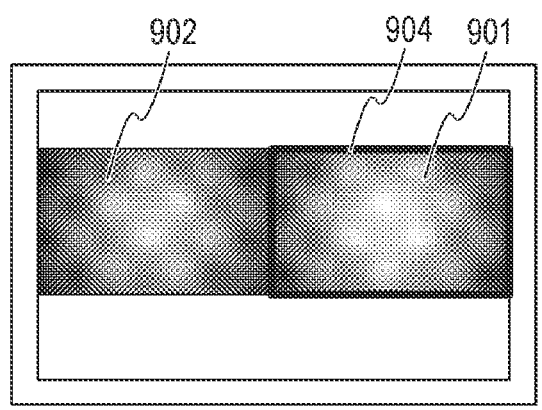

As indicated in FIG. 9D, a user operation, to select one of the plurality of SDR images, may be available. The cursor 904 is a cursor used to select an SDR image, and the user can select one of the plurality of SDR images by moving the cursor 904, using a four-direction key or the like. The display apparatus 800 selects one of the plurality of SDR images according to the user operation, and outputs the selected SDR image on an external apparatus.

Figure 9E:
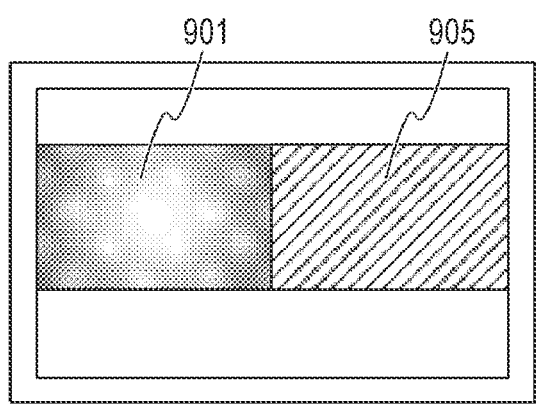

As indicated in FIG. 9E, instead of displaying the SDR image selected according to the user operation out of the plurality of SDR images, the display apparatus 800 may display the HDR image 900 and the selected SDR image together. In the case where the screen before the selection is the screen in FIG. 9D, the SDR image 901 or the SDR image 902 is displayed in the region 905 in FIG. 9E. Thereby the user can recognize the image quality changed by the HDR-SDR conversion after the difference of the SDR image, depending on the difference of the over compatible range, is recognized.

Figure 9F:
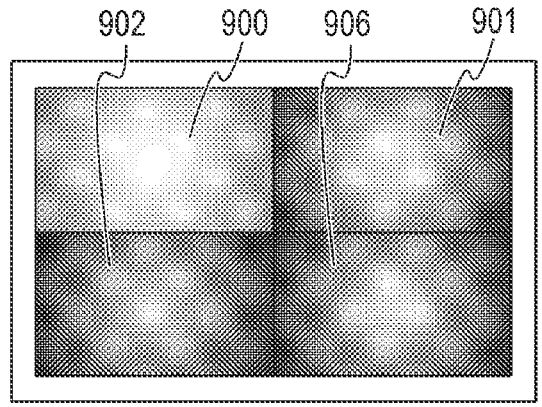

FIG. 9F indicates a comparative screen on which the HDR image 900 and three SDR images 901, 902 and 906 are displayed together (four-screen display comparative screen). The HDR image 900 and the SDR images 901 and 902 are as described above. The SDR image 906 is an SDR image for which an over compatible range, that is different from that of the SDR image 902, is set. For example, the SDR image 902 is an SDR image for which the widest over compatible range (over compatible range corresponding to the widest over range) is set, and the SDR image 906 is an SDR image for which an over compatible range that is narrower than that of the SDR image 902 is set. One of the SDR images, 901, 902 and 906, is the SDR image (second image) acquired using the conversion table T that is the same as in Embodiments 1 to 4. The rest of the SDR images 901, 902 and 906 are the SDR images (third images) acquired using a conversion table T that is different from that of Embodiments 1 to 4. If two out of the three SDR images 901, 902 and 906 are similar, three screens may be displayed without displaying one of these similar two SDR images. In this case, various information may be displayed in the open region (region where an SDR image is not displayed).

In a case where the over white determining unit 105 determines that an over range does not exists, the control unit 801 may control such that only two images, that is, the HDR image and an SDR image acquired using the conversion table T that is the same as in Embodiments 1 to 4, are displayed together. In a case where the over white determining unit 105 determined that an over range exists, the control unit 801 may control such that a plurality of SDR images are displayed together, as indicated in FIGS. 9B, 9C, 9D and 9F.

Preferred embodiments of the present invention have been described. According to the present invention, an SDR signal, including an over white and an SDR signal not including an over white, can be visually compared, and furthermore, a desired SDR signal can be selected and outputted in the comparative display state.

Although the present invention has been described with reference to preferred embodiments (examples), the present invention is not limited to these specific embodiments, and various modes in a range not departing from the spirit of the invention, are also included in the present invention. Furthermore, each of the above described embodiments merely exemplifies an embodiment of the present invention, and each embodiment may be combined as necessary.

According to the present disclosure, the dynamic range of an image can be converted with controlling the change in the gradation distribution (distribution of lightness) of an image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-044832, filed on Mar. 18, 2021, which is hereby incorporated by reference herein in its entirety.

What is claimed is:

1. An image processing apparatus comprising at least one memory and at least one processor function as:
   a first determining unit configured to determine a first brightness range, which is included in a dynamic range of a first image and is higher than a predetermined brightness; and
   a first converting unit configured to convert the first image into a second image, of which a dynamic range is narrower than the dynamic range of the first image, based on the determination result by the first determining unit, wherein
   based on the first brightness range determined by the first determining unit, the first converting unit determines a second brightness range, which is included in the dynamic range of the second image and corresponds to the first brightness range.

2. The image processing apparatus according to claim 1, wherein the first brightness range is a brightness range of over white.

3. The image processing apparatus according to claim 1, wherein
   the first converting unit widens the second brightness range as the first brightness range widens.

4. The image processing apparatus according to claim 1, wherein
   the first converting unit determines the second brightness range based on a ratio of the predetermined brightness and a maximum brightness in the first brightness range.

5. The image processing apparatus according to claim 1, wherein
   the first converting unit determines the second brightness range based on a ratio of a gradation value of the first image corresponding to the predetermined brightness and a gradation value of the first image corresponding to a maximum brightness in the first brightness range.

6. The image processing apparatus according to claim 1, wherein
   the first converting unit determines the second brightness range based on a ratio of: a width of the first brightness range in the dynamic range of the first image; and a width of a brightness range determined by excluding a predetermined brightness range from a remaining brightness range in the dynamic range of the first image.

7. The image processing apparatus according to claim 1, wherein
   the dynamic range of the second image is changeable, and
   the first converting unit widens the dynamic range of the second image as the first brightness range widens.

8. The image processing apparatus according to claim 1, wherein
   the at least one memory and the at least one processor further function as:
   a second determining unit configured to determine a dynamic range of the first image; and
   a second converting unit configured to convert an input image into the first image based on the dynamic range determined by the second determining unit.

9. The image processing apparatus according to claim 1, wherein
   the first image is a high dynamic range (HDR) image, and the second image is a standard dynamic range (SDR) image.

10. The image processing apparatus according to claim 1, wherein
    the at least one memory and the at least one processor further function as a control unit configured to control to display the second image.

11. The image processing apparatus according to claim 10, wherein
    the control unit controls such that the second image, which is acquired based on the determining result of the first determining unit, and a third image, which is acquired by converting the first image, and is an image having a dynamic range narrower than the dynamic range of the first image, and is an image different from the second image, are displayed together.

12. The image processing apparatus according to claim 11, wherein
    after the second image and the third image are displayed together, the control unit controls such that the second image or the third image is selected according to a user operation, and the selected image is outputted to an external apparatus.

13. The image processing apparatus according to claim 11, wherein
    after the second image and the third image are displayed together, the control unit controls such that the second image or the third image is selected according to a user operation, the unselected image out of the second image and the third image is not displayed, and the selected image and the first image are displayed together.

14. The image processing apparatus according to claim 11, wherein
    in a case where the first determining unit determined that the first brightness range does not exist, the control unit controls such that the third image is not displayed and the first image and the second image are displayed together, and in a case where the first determining unit determined that the first brightness range exists, the control unit controls such that the second image and the third image are displayed together.

15. The image processing apparatus according to claim 11, wherein the control unit controls such that at least one of:

an image that is acquired based on an assumption that the first brightness range does not exist;

an image that is acquired by using a third brightness range, which is a brightness range higher than the predetermined brightness and is a brightness range narrower than the first brightness range, instead of the first brightness range; and an image that is acquired by using a fourth brightness range, which is a brightness range higher than the predetermined brightness and is a brightness range wider than the first brightness range, instead of the first brightness range, is displayed as the third image.

16. The image processing apparatus according to claim 11, wherein in a case where the second image and the third image are displayed together, the control unit controls such that the first image is also displayed.

17. The image processing apparatus according to claim 10, wherein the control unit controls such that a region corresponding to the second brightness range, in the images to be displayed, is made identifiable.

18. A display apparatus comprising:

the image processing apparatus according to claim 1; and a display panel configured to display an image.

19. An image processing method comprising:

a determining step of determining a first brightness range, which is included in a dynamic range of a first image and is higher than a predetermined brightness; and a converting step of converting the first image into a second image, of which a dynamic range is narrower than the dynamic range of the first image, based on the determination result in the determining step, wherein in the converting step, based on the first brightness range determined in the determining step, a second brightness range, which is included in the dynamic range of the second image and corresponds to the first brightness range, is determined.

20. A non-transitory computer readable medium that stores a program, wherein the program causes a computer to execute an image processing method comprising:

a determining step of determining a first brightness range, which is included in a dynamic range of a first image and is higher than a predetermined brightness; and a converting step of converting the first image into a second image, of which a dynamic range is narrower than the dynamic range of the first image, based on the determination result in the determining step, wherein in the converting step, based on the first brightness range determined in the determining step, a second brightness range, which is included in the dynamic range of the second image and corresponds to the first brightness range, is determined.

* * * * *